United States Patent [19]

Krishnamurthy

[11] Patent Number: 6,084,642
[45] Date of Patent: Jul. 4, 2000

[54] RECEIVER FOR ADJUSTING SYNC LEVELS IN VSB SYSTEMS

[75] Inventor: Gopalan Krishnamurthy, Wheeling, Ill.

[73] Assignee: Zenith Electronics Corporation, Glenview, Ill.

[21] Appl. No.: 08/726,498

[22] Filed: Oct. 7, 1996

[51] Int. Cl.[7] .............................. H04N 5/44; H04N 5/04; H04N 5/455; H04L 23/02

[52] U.S. Cl. .......................... 348/725; 348/725; 348/500; 348/501; 348/726; 375/377; 375/264; 375/262; 375/340

[58] Field of Search .................................. 348/553, 554, 348/555, 557, 500, 501, 521, 725, 731, 495, 528, 54, 682, 117, 678–685, 558, 536, 726, 471, 472; 375/268, 270, 320, 350, 345, 377, 262, 264, 216, 340–1, 279–80

[56] References Cited

U.S. PATENT DOCUMENTS

| | | | |
|---|---|---|---|
| 3,795,762 | 3/1974 | Willis | 178/5.4 R |
| 5,086,340 | 2/1992 | Citta et al. | 358/141 |
| 5,274,676 | 12/1993 | Gosc et al. | 375/106 |
| 5,386,239 | 1/1995 | Wang et al. | 348/472 |
| 5,406,587 | 4/1995 | Horwitz et al. | 375/346 |
| 5,486,869 | 1/1996 | Cooper | 348/525 |
| 5,508,748 | 4/1996 | Krishnamurthy et al. | 348/475 |
| 5,534,938 | 7/1996 | Citta et al. | 348/495 |
| 5,548,339 | 8/1996 | Kim | 348/525 |
| 5,577,087 | 11/1996 | Furaya | 375/377 |
| 5,598,220 | 1/1997 | Citta et al. | 348/471 |
| 5,602,601 | 2/1997 | Kim et al. | 348/607 |
| 5,619,269 | 4/1997 | Lee et al. | 348/432 |
| 5,684,827 | 11/1997 | Nielsen | 375/232 |
| 5,745,528 | 4/1998 | Fimoff et al. | 375/316 |
| 5,796,786 | 8/1998 | Lee | 375/326 |
| 5,933,460 | 8/1999 | Lee | 375/324 |
| 5,987,070 | 11/1999 | Fimoff et al. | 375/286 |

*Primary Examiner*—John K. Peng
*Assistant Examiner*—Paulos Natnael

[57] ABSTRACT

A receiver for receiving a cable and terrestrial digital signals of differing VSB modes where the data levels of the various signals have a desired relationship that enables simple data level slicing and error determination. Some of the signals have sync levels that do not conform to the desired relationship and the receiver includes a comb filter for reducing interference when receiving an 8VSB terrestrial signal. The mode of the received signal is determined and a correction factor is applied to the syncs of the signals as needed to reestablish the desired relationship. Operation of the comb filter results in additional levels and a disruption of the desired relationship. For such cases, the comb filtered data levels are modified to make them a subset of the VSB 16 data levels. The modifications are accomplished in feedback paths of the phase tracker after the circuit equalizer and do not affect the data levels passed to the next stage.

11 Claims, 2 Drawing Sheets

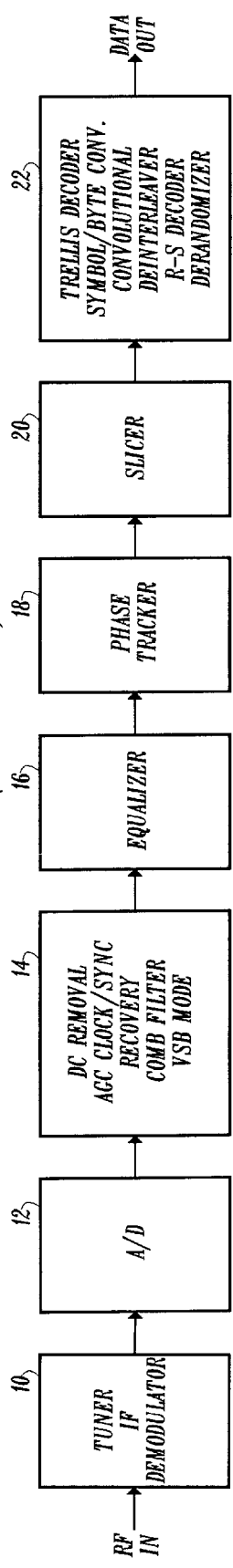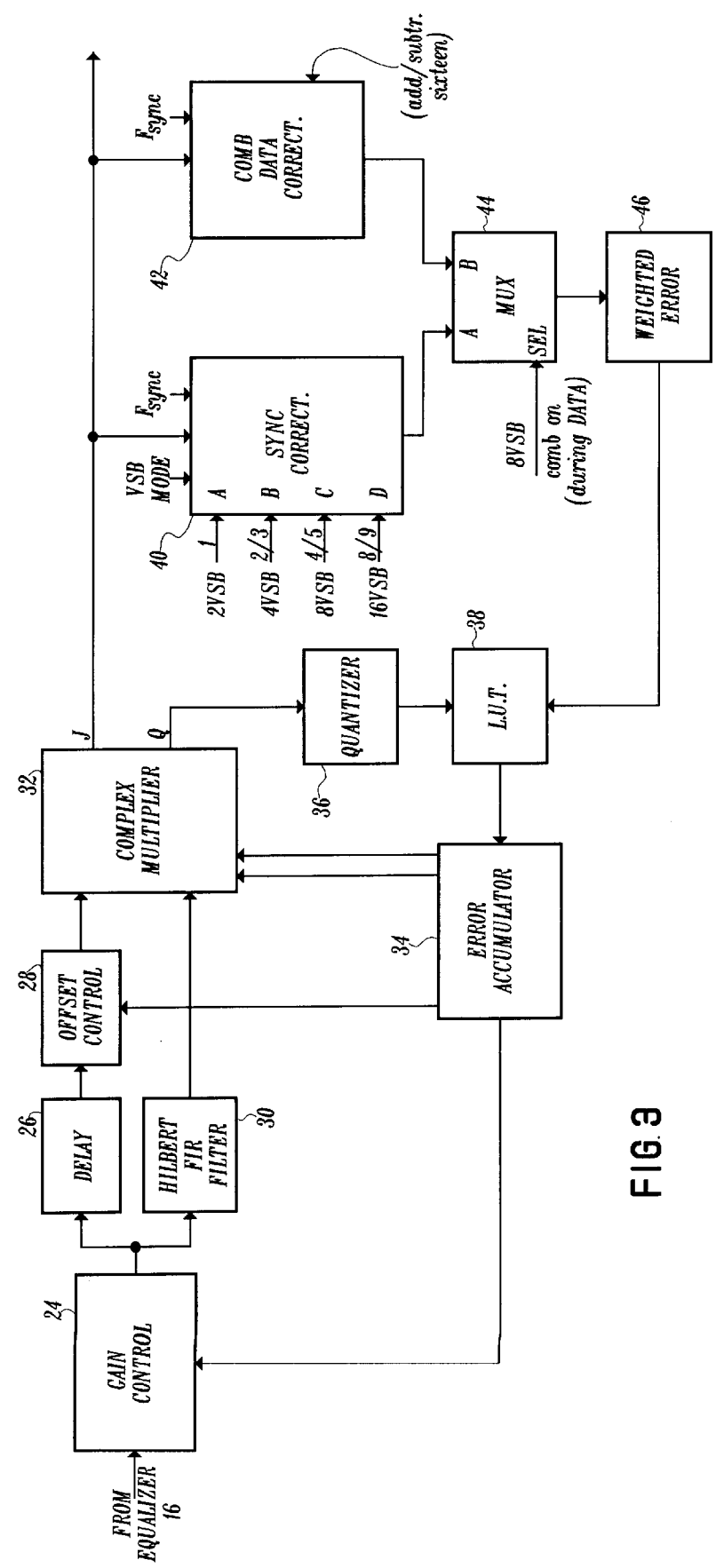

RECEIVER FOR ADJUSTING SYNC LEVELS IN VSB SYSTEMS

CROSS REFERENCE TO RELATED PATENTS AND APPLICATIONS

This invention is related to U.S. Pat. No. 5,508,748, entitled DATA LEVEL SELECTION FOR MULTILEVEL VSB TRANSMISSION SYSTEM and U.S. Pat. No. 5,406,587, entitled ERROR TRACKING LOOP, which are hereby incorporated by reference.

BACKGROUND OF THE INVENTION AND PRIOR ART

This invention relates to VSB (vestigial sideband) signal systems and specifically to methods and apparatus for processing the sync and data symbols in digital VSB signals.

The recently adopted standards for digital VSB terrestrial signals establishes certain data and sync symbol levels. In the ATSC (Advanced Television Systems Committee) document, the data levels to be used for the 8VSB (trellis coded) and 16VSB (ATSC) transmission systems are specified. The VSB transmission system is not restricted to over-the-air (terrestrial) transmission and Zenith Electronics Corporation has specified three more modes that can be used for cable or MMDS systems. These VSB modes are identified as 8/4/2 VSB modes. The 8VSB trellis coded and 8VSB modes are identical except for their data rates. As fully discussed in the above-mentioned patent, the data levels and sync levels in the various VSB modes may be selected to bear a desired relationship to each other, which results in great simplification and reduced cost in data slicing and error correction. Unfortunately, that desired relationship is not present during the bilevel segment and frame reference sync in the standards adopted by ATSC and need not be present in VSB signals that may be used.

The Zenith 8VSB trellis coded mode also contemplates the use of a comb filter in the receiver for minimizing interference from NTSC co-channel signals. When the comb filter is active, it increases the number of data levels, which also results in a departure from the desired relationship mentioned above.

The present invention solves the problems created by the above over-the-air signals and enables a VSB receiver to process all VSB mode signals in an efficient and cost effective manner.

OBJECTS OF THE INVENTION

A principal object of the invention is to provide a novel VSB receiver.

Another object of the invention is to provide a VSB receiver that can process all VSB mode signals in a simple manner.

A further object of the invention is to provide a novel method and apparatus for processing VSB mode signals.

BRIEF DESCRIPTION OF THE DRAWING

These and other objects and advantages of the invention will be apparent upon reading the following description thereof in conjunction with the drawing, in which:

FIG. 1 is a simplified partial block diagram of a prior art VSB receiver; and

FIG. 3 is a block diagram of the phase tracker of FIG. 1 that embodies the invention.

DESCRIPTION OF THE PREFERRED EMBODIMENT

Figure 2:
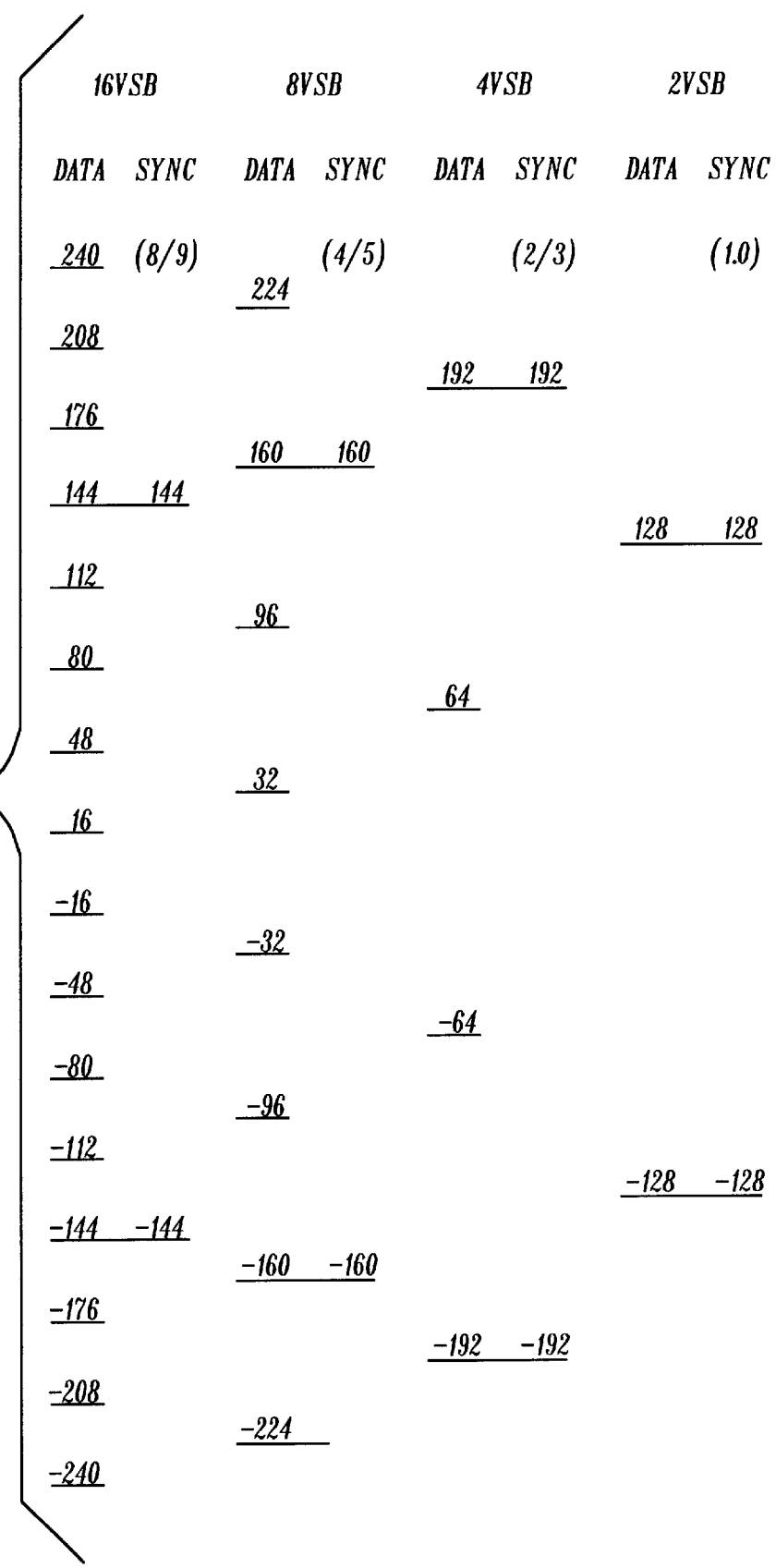
FIG. 2 is a chart showing the data and sync levels for the 16/8/4/2 VSB signals.

Referring to FIG. 1, an RF signal (which may be cable or over-the-air) is applied to a tuner IF and demodulator 10 where it is processed in a well known manner to develop a baseband analog signal. The demodulated signal is converted to digital form in an A/D (analog-to-digital) converter 12 and applied to a block 14 that includes appropriate circuitry for performing DC removal, developing an AGC potential, recovering symbol clock information and sync signals, and operating a comb filter. The VSB mode of the received signal is also determined at this point. The signal is applied to an equalizer 16 that in turn supplies a phase tracker 18, which is operated in accordance with the teachings of U.S. Pat. No. 5,406,587. The phase tracker supplies a slicer 20 that operates as described in the above-mentioned patent to recover the symbols in the received signal. Slicer 20 feeds a block 22 that includes a trellis decoder, a symbol/byte converter, convolutional deinterleaver circuitry, an R-S decoder and a derandomizer, all of which are well known in the art. The output data is applied to well known television or data processing circuitry (not shown) for display/use of the data.

The chart in FIG. 2 illustrates the data levels of the 16/8/4/2 VSB signals. It will be appreciated that these levels are not to be considered a limitation of the invention. The corresponding sync levels for different VSB mode signals are also indicated. Note that the sync levels are coincident with two of the data levels in its corresponding signal, but differ for each of the signals. These sync levels depart from the desired relationship discussed in the U.S. Pat. No. 5,508,748. The number in parenthesis for each VSB mode signal indicates the factor by which the sync levels for that signal is to be multiplied to reestablish the desired relationship between the data and sync in that signal.

FIG. 3 represents phase tracker 18 and includes a gain block 24 that supplies a complex multiplier 32, through a delay circuit 26 and an offset control 28, and also through a Hilbert FIR filter 30. The complex multiplier 32 supplies an I channel output that constitutes the recovered data and a Q channel output that supplies a quantizer 36. The quantizer 36 feeds a LUT (look-up table) 38 that supplies an error accumulator 34 for developing sine and cosine correction signals for complex multiplier 32, a control signal for offset control 26 and a control signal for gain control block 24. The above-described circuits operate as discussed in U.S. Pat. No. 5,406,587 and are not part of the present invention.

The I channel data is applied to a sync corrector 40 that is also supplied with the VSB mode signal and a frame sync signal. Sync corrector 40 has four control inputs A, B, C and D. As indicated, A represents a gain of 1, B a gain of 2/3, C a gain of 4/5 and D a gain of 8/9. A receives a control signal and is activated when a 2VSB signal is received, B is activated for a 4VSB signal, C is activated when an 8VSB signal is received and D is activated when a 16VSB signal is received. These are the signals where the sync levels depart from the desired relationship. The output of sync corrector 40 is applied to the A input of a multiplexer 44 that is controlled by an enabling signal at its SEL input when an 8VSB trellis coded signal is being received with the comb filter being activated during data. The B input of multiplexer 44 receives corrected data as will be discussed. The output of multiplexer 44 is supplied to a weighted error circuit 46 that in turn supplies LUT 38.

The weighted error circuit 46 evaluates the difference between the actual received data and the nearest valid data level for that VSB mode. This I data error is then weighted to reduce its sensitivity to white noise (amplitude noise). For example, if the distance between two adjacent data levels is 'd', the range for any individual data level is (+d/2,-d/2). Data errors up to (+d/4,-d/4) are not modified. The error magnitudes larger than (d/4) are weighted such that an error of (d/2) is zero. The weighted I channel error and the quantized Q channel data are supplied to LUT 38. LUT 38 provides the desired correction signal for correcting any phase error, offset error and gain error present in the received data.

To correct the data levels for their departure from the desired relationship when the comb filter is active, a comb data corrector 42 is added. The comb data corrector receives the I channel data and a frame sync and adds (or subtracts) 16 to the recovered data levels. This makes the 15 data levels, created from the 8VSB signal during comb filtering, a subset of the 16VSB data levels, thus restoring the desired relationship among the data levels. As the output of comb data corrector 42 is applied to the B input of multiplexer 44, this data is only used when the select input of the mutliplexer 44 receives an input responsive to an 8VSB trellis coded signal being received and having the comb filter activated. Note that the corrections that are made to the signal are only in the feedback path of the phase tracking loop and do not affect the data levels passed to the next stage.

The sync levels in the Zenith 16/8/4/2 VSB modes should be ideally +128 and -128 for an appropriate size scale factor. In the 8VSB trellis coded mode, the corresponding sync levels have been established at +160 and -160. To correct them, i.e., bring them to the +/-128 levels, a multiplication factor of 4/5 is applied to the syncs when corrected by sync corrector 40. When corrected, the syncs of the 8VSB trellis coded signal bear a specific desired relationship to the rest of the signal. Similarly, the sync levels of the 16VSB ATSC signal are +1-144. (The data levels are the same.) Therefore a multiplier of 8/9 is applied to the syncs in the 16VSB ATSC signal, which restores the desired relationship to the signal. For a 4VSB signal a correction factor 2/3 is applied and a 2VSB signal needs no correction factor. It will be appreciated that the selection of the 2VSB sync levels as the base to which the other sync levels are corrected is arbitrary. The specific levels and correction factors are not limiting of the invention. It should also be appreciated that the implementation shown is preferred although other implementations may be used. For example, a look-up table correlating the sync levels with error information for the least significant bits in each mode could be used to achieve the desired relationship specified in U.S. Pat. No. 5,508,748. Also, the known sync values could be stored and the received sync values subtracted therefrom to obtain the error that requires compensation by the tracker. These modifications are clearly within the scope of the present invention.

The comb data correction has been briefly discussed. When the comb filter operates with the eight level 8VSB signal, fifteen levels of signal result, with the levels differing by sixteen from the corresponding levels of a 16VSB cable signal. The fifteen levels of the combed signal can be made to correspond with fifteen of the sixteen levels of a 16VSB cable signal by adding (or subtracting) 16 for each combed level. This makes the fifteen levels of the combed signal a subset of the 16VSB signal and again restores the desired relationship.

What has been described is a novel method and apparatus for correcting the sync levels of different mode VSB signals to restore a desired relationship between the sync levels and data levels, thereby enabling the use of simple and cost effective slicer circuitry. Similarly, the changed data levels of a comb filtered 8VSB trellis coded signal are converted to a subset of the sixteen levels of a 16VSB signal. It is recognized that numerous changes in the described invention will be apparent to those skilled in the art without departing from its true spirit and scope. The invention is to be limited only as defined in the claims.

What is claimed is:

1. A method of operating a receiver for processing digital signals of different modes that include data levels that have a desired data level relationship, the sync levels of one or more of the transmitted digital signals departing from the desired data level relationship in known respects, comprising:

determining the mode of the transmitted digital signal being received; and altering the sync levels of the one or more received digital signals to conform to the desired data level relationship.

2. The method of claim 1, wherein said different modes comprise cable and terrestrial VSB signals of differing VSB mode and wherein said altering further comprises:

determining a correction factor for the sync levels of said one or more received digital signals; and applying the correction factor to the sync levels of said one or more received digital signals.

3. The method of claim 1, wherein the receiver includes a selectively operable comb filter, operation of the comb filter changing the data levels and causing a departure from the desired data level relationship and further comprising:

modifying the changed data levels to reestablish the desired data level relationship.

4. The method of claim 3, wherein the comb filter is used to process a signal of given VSB mode and wherein the modifying comprises changing the changed data levels of the comb filtered signal to convert them to a subset of the data levels of a signal of higher VSB mode.

5. The method of claim 4, wherein the given VSB mode is 8 and the higher VSB mode is 16, and wherein the modifying comprises raising or lowering the comb filtered levels by a fixed amount to have them correspond to adjacent data levels of the signal of VSB mode 16.

6. A receiver for receiving a plurality of different mode, transmitted digital signals that include data levels that have a desired data level relationship, the sync levels of one or more of said digital signals departing from said desired relationship, comprising:

means for determining the mode of the digital signal being received;

means for altering said sync levels of said one or more digital signals to conform to said desired relationship; and means for enabling said altering means in response to said determining means when one of said one or more digital signals is being received.

7. The receiver of claim 6, wherein said different mode signals include cable and terrestrial VSB signals of differing VSB mode and wherein said altering means comprises:

means for generating a correction factor for said syncs of said one or more digital signals; and means for applying said correction factor to adjust said syncs of said one or more digital signals in response to said determining means.

8. The receiver of claim 7, further including error correction means for correcting for errors in received data levels and wherein said corrected sync levels are supplied to said error correction means.

9. The receiver of claim 6, further including:

comb filter means for reducing interference in a terrestrial signal of given VSB mode, said comb filter means changing said data levels and altering said desired relationship; and means responsive to said determining means, for modifying the changed data levels to reestablish said desired relationship when said comb filter means is active.

10. The receiver of claim 9, wherein said modifying means converts the data levels of said comb filtered signal of given VSB mode to a subset of the data levels of a signal of higher VSB mode.

11. The receiver of claim 10, wherein said given VSB mode is 8 and said higher VSB mode is 16, said modifying means including:

means for changing said comb filtered data levels by a fixed amount to have them correspond to adjacent data levels of said VSB mode 16 signal.

\* \* \* \* \*